(12) United States Patent
Itoh et al.

(10) Patent No.: US 11,097,899 B2
(45) Date of Patent: Aug. 24, 2021

(54) CONVEYOR DEVICE AND CONVEYING-DIRECTION CHANGING DEVICE

(71) Applicant: ITOH DENKI CO., LTD., Kasai (JP)

(72) Inventors: Kazuo Itoh, Kasai (JP); Tatsuhiko Nakamura, Hyogo (JP); Takahiro Itoh, Himeji (JP)

(73) Assignee: Itoh Denki Co., Ltd., Hyogo (JP)

( * ) Notice: Subject to any disclaimer, the term of this patent is extended or adjusted under 35 U.S.C. 154(b) by 0 days.

(21) Appl. No.: 16/607,184

(22) PCT Filed: Feb. 25, 2019

(86) PCT No.: PCT/JP2019/006994
§ 371 (c)(1),
(2) Date: Oct. 22, 2019

(87) PCT Pub. No.: WO2019/167864
PCT Pub. Date: Sep. 6, 2019

(65) Prior Publication Data
US 2020/0385213 A1    Dec. 10, 2020

(30) Foreign Application Priority Data
Feb. 27, 2018    (JP) .............................. JP2018-033203

(51) Int. Cl.
*B65G 13/10* (2006.01)
*B65G 39/18* (2006.01)
*F16H 1/20* (2006.01)

(52) U.S. Cl.
CPC ............. *B65G 13/10* (2013.01); *B65G 39/18* (2013.01); *F16H 1/20* (2013.01)

(58) Field of Classification Search
None
See application file for complete search history.

(56) References Cited

U.S. PATENT DOCUMENTS 5,222,585 A    6/1993   van der Werff
5,921,374 A *  7/1999   Takino ................... B65G 13/10
                                                     198/369.4
(Continued)

FOREIGN PATENT DOCUMENTS

CN    104884370 A    9/2015
JP    6-298321 A    10/1994
(Continued)

OTHER PUBLICATIONS

International Preliminary Report on Patentability and Written Opinion of the International Searching Authority, dated Aug. 27, 2020 in International Patent Application No. PCT/JP2019/006994.
(Continued)

*Primary Examiner* — Kavel Singh
(74) *Attorney, Agent, or Firm* — Wood, Phillips, Katz, Clark & Mortimer

(57) ABSTRACT

An objective is to develop a conveyor device capable of conveying a conveyance object in a plurality of directions. The conveyor device includes a roller portion (rotating body) 30 and a driving body 50. The rotating body 30 is rotatable around at least a first rotation axis 60, and the rotating body is rotatable around a second rotation axis 61 in a direction intersecting with the first rotation axis 60, and changes an attitude by rotating to change a direction of the first rotation axis 60. The driving body 50 is rotated by power around a third rotation axis 62, and the third rotation axis 62 extends in a direction intersecting with the first rotation axis 60. The driving body 50 is in contact with the rotating body at a position eccentric to one end in the direction of the first rotation axis 60 relative to the second rotation axis 61 regardless of attitude-changing of the rotating body.

20 Claims, 16 Drawing Sheets

(56) References Cited

U.S. PATENT DOCUMENTS

| | | | | |
|---|---|---|---|---|
| 6,340,083 B1* | 1/2002 | Zhou | ................. | B64D 9/00 |
| | | | | 198/370.09 |
| 7,040,478 B2* | 5/2006 | Ehlert | ................. | B65G 13/10 |
| | | | | 198/369.4 |
| 8,978,879 B2* | 3/2015 | Fourney | ............ | B65G 39/12 |
| | | | | 198/782 |
| 9,309,954 B2* | 4/2016 | Wilkins | ............ | B65G 39/025 |
| 9,878,856 B2* | 1/2018 | Specht | ............. | B65G 13/02 |
| 10,549,917 B2* | 2/2020 | Garehan | ............ | B65G 13/10 |
| 2001/0052447 A1 | 12/2001 | Nakamura | | |
| 2014/0116841 A1 | 5/2014 | Wilkins | | |

FOREIGN PATENT DOCUMENTS

| | | | |
|---|---|---|---|
| JP | 9-240818 | A | 9/1997 |
| JP | 2002-002932 | A | 1/2002 |
| JP | 2012-051680 | A | 3/2012 |
| JP | 2015-779 | A | 1/2015 |
| JP | 2015-163547 | A | 9/2015 |
| JP | 2015-163549 | A | 9/2015 |

OTHER PUBLICATIONS

International Search Report dated May 28, 2019 in International Application No. PCT/JP2019/006994.

* cited by examiner

ATTITUDE
INDICATION

ATTITUDE
INDICATION

ATTITUDE INDICATION

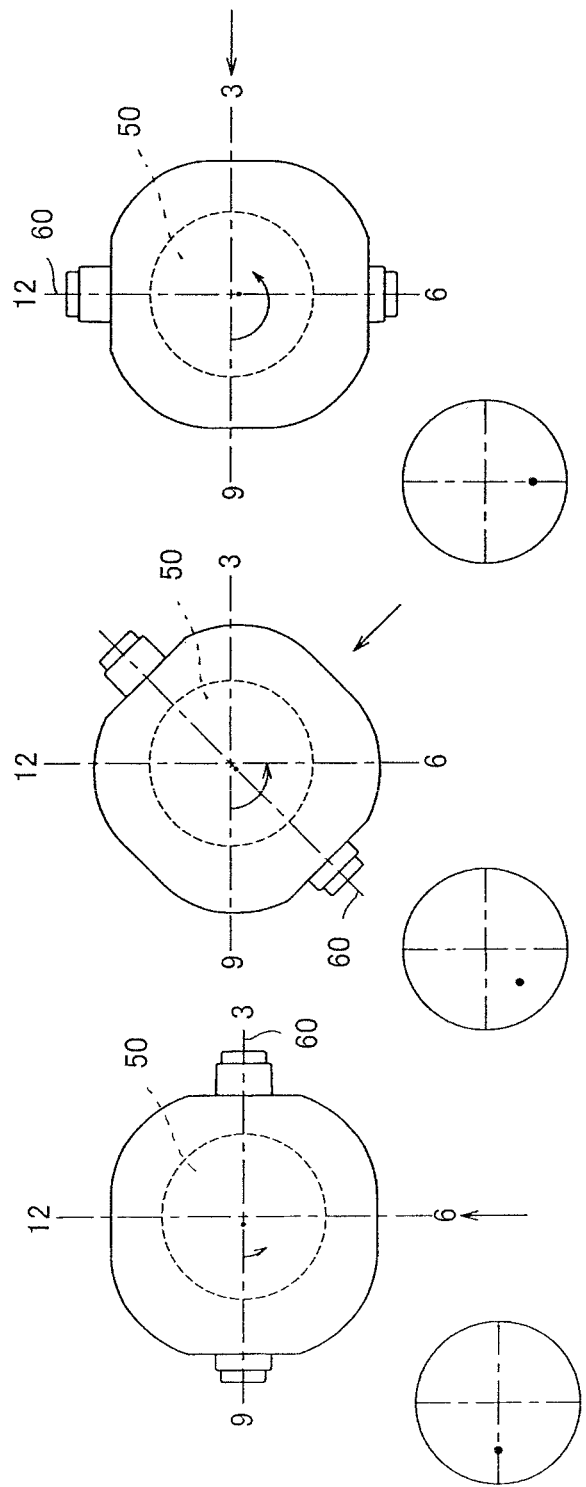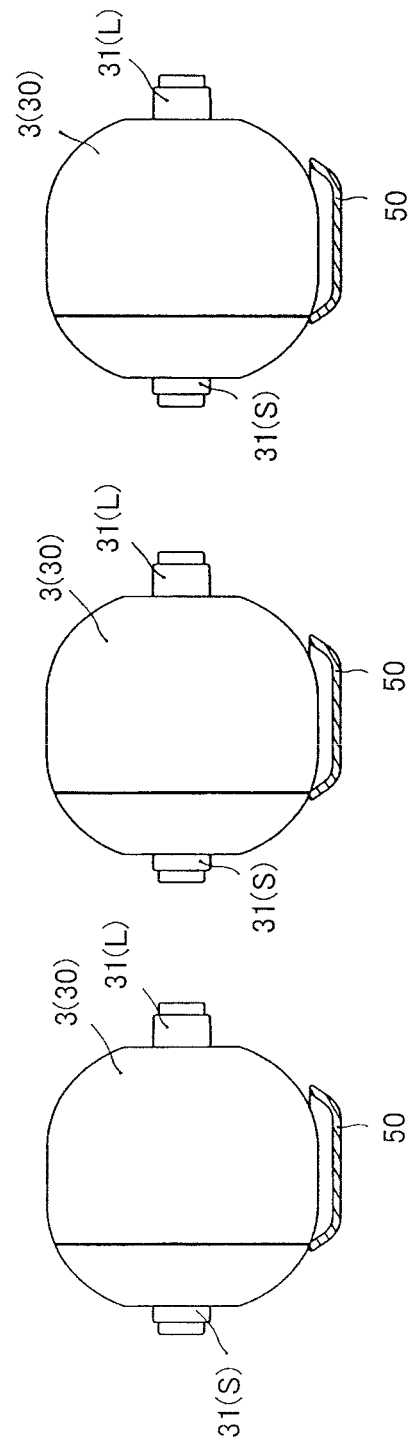
FIG. 11A  FIG. 11B  FIG. 11C

CONVEYOR DEVICE AND CONVEYING-DIRECTION CHANGING DEVICE

TECHNICAL FIELD

The present invention relates to a conveyor device that conveys a conveyance object, more particularly to a conveyor device that carries out the conveyance object in a plurality of directions and carries in the conveyance object from a plurality of directions.

Moreover, the present invention relates to a conveying-direction changing device that changes a conveyance direction of a conveyance object.

BACKGROUND ART

Many types of conveyance objects are handled in a delivery center, a collection center, a warehouse, or the like. In some cases, a large number of conveyance objects are sorted, and loaded on a truck or carried to a specific shelf.

In the related art, conveyance objects am sorted by a sorting system in which a plurality of transfer devices as disclosed in Patent Documents 1, 2, and 3 are installed.

The transfer devices described in Patent Documents 1 and 2 have a main conveying passage through which a conveyance object passes linearly and a sub conveying passage through which the conveyance object is carried out in an orthogonal direction, and the conveyance object can be transferred to another conveyor line.

The transfer device described in Patent Document 3 has a main conveying passage through which a conveyance object passes linearly and a discharge unit that discharges the conveyance object in an oblique direction, and the conveyance object can obliquely be carried out and transferred to another conveyor line.

The sorting system in the related art is a system in which many transfer devices as described above are arranged such that conveyor lines are branched in a complex manner. A conveyance object is conveyed by the sorting system, delivered to a subsidiary conveyor line branched from an original conveyor line to gradually narrow down a conveying destination, and moved to the intended conveying destination.

PRIOR ART DOCUMENTS

Patent Documents

Patent Document 1: JP 2015-163549 A
Patent Document 2: JP 2012-51680 A
Patent Document 3: JP 2015-163547 A

DISCLOSURE OF INVENTION

Technical Problem

The transfer device in the related art selectively carries out the introduced object in specific two directions.

As a result, the sorting system in the related art includes complicated branching conveyor lines, and is on a considerably large scale. That is, a large installation place is required in order to construct the sorting system in the related art.

The present invention has focused on the above problem, and an object of the present invention is to develop a conveyor device capable of carrying out an object in any direction.

Solution to Problem

An aspect to solve the problem described above is a conveyor device, including: a rotating body that energizes a conveyance object; and a driving body that gives a rotating force to the rotating body, wherein the rotating body is rotatable around at least a first rotation axis, the rotating body being rotatable around a second rotation axis extending in a direction intersecting with the first rotation axis, thereby changing its attitude to change a direction of the first rotation axis, wherein the driving body is rotated around a third rotation axis with power, the third rotation axis extending in a direction intersecting with the first rotation axis, wherein the driving body is in contact with the rotating body at a position eccentric to one end in the direction of the first rotation axis relative to the second rotation axis, and wherein regardless of attitude-changing of the rotating body, the rotating body is rotated with rotation of the driving body.

The conveyor device of the present aspect places a conveyance object on the rotating body and moves the conveyance object by rotating the rotating body.

In the conveyor device of the present aspect, the rotating body is rotated not only around the first rotation axis, but also around the second rotation axis in a direction intersecting with the first rotation axis.

Here, "a direction intersecting" includes, in addition to "a direction orthogonal", "a configuration to intersect in a direction to incline". Moreover, "intersecting" includes, in addition to a case where axes intersect with each other, a state of three-dimensionally intersecting. That is, it includes a case of intersecting in a staggered state.

The driving body is rotated by power around the third rotation axis. The third rotation axis extends in a direction intersecting with the first rotation axis. Here, although it is preferable that the third rotation axis and the second rotation axis are coaxial, the both axes may be different.

The third rotation axis of the driving body and the first rotation axis of the rotating body extend in respective directions intersecting with each other, and accordingly, when the driving body is rotated, the rotating body is rotated by being energized in a tangential direction.

In the conveyor device of the present aspect, regardless of the attitude of the rotating body, the driving body comes into contact with the rotating body at a position eccentric to one side in the direction of the first rotation axis relative to the second rotation axis, and regardless of the attitude-changing of the rotating body, the rotating body is rotated by rotation of the driving body.

Accordingly, even if the direction of the first rotation axis is changed by rotation of the rotating body and the conveyance direction of a conveyance object is changed, it is possible to transmit power from the driving body to the rotating body and to send out the conveyance object in a desired direction.

In the aspect described above, it is preferable that the second rotation axis and the third rotation axis are aligned approximately on a same straight line, and a center of the rotating body in the direction of the first rotation axis is eccentric relative to the third rotation axis.

"Aligned on approximately the same straight line" means to be substantially on the same straight line. According to the present aspect, since the second rotation axis and the third rotation axis are aligned approximately on the same straight line, the whole shape does not become excessively large.

In the present aspect, since the center of the rotating body in the direction of the rotation axis is eccentric relative to the third rotation axis, the rotating body itself has a positional relationship eccentric relative to the second rotation axis and the third rotation axis.

Therefore, regardless of the attitude of the rotating body, the driving body is in contact with the rotating body at a position eccentric to one side in the direction of the first rotation axis relative to the second rotation axis.

In each aspect described above, it is preferable that the rotating body is spherical, barrel-shaped, or columnar, and regardless of attitude-changing of the rotating body, a circumference of a part of the rotating body in an axial direction is in contact with the driving body and other parts are substantially not in contact with the driving body.

According to the present aspect, the driving body is in a state of a one-side contact with the rotating body, and a force applied from the driving body to the rotating body in the tangential direction is in only one direction. Therefore, the rotating body is rotated smoothly.

Moreover, since the driving body is in a state of a one-side contact with the rotating body, even if the direction of the rotating body changes, a part of the driving body is made to always come into contact with the rotating body and the rotating body can be rotated.

In each aspect described above, it is preferable that the driving body includes an annular contact portion, the contact portion is in contact with a part of the rotating body, and the rotating body is rotated with rotation of the contact portion.

According to the present aspect, the driving body is in contact with a part of the rotating body at the annular contact portion. Therefore, even if the direction of the rotating body changes, a part of the driving body is made to always come into contact with the rotating body, and the rotating body can be rotated.

Another aspect to solve the problem described above is a conveyor device, including: a rotating body that energizes a conveyance object; and a driving body that gives a rotative force to the rotating body, wherein the rotating body is rotatable around at least a first rotation axis, the rotating body being rotatable around a second rotation axis extending in a direction intersecting with the first rotation axis, thereby changing its attitude to change a direction of the first rotation axis, wherein the driving body is rotated with power, wherein the driving body includes an annular contact portion, the contact portion being in contact with the rotating body in a manner of a partial contact, and wherein regardless of attitude-changing of the rotating body, the rotating body is rotated with rotation of the driving body.

According to the aspect, since the driving body is in a state of a one-side contact relative to the rotating body, even if the direction of the rotating body changes, a part of the driving body is made to always come into contact with the rotating body, and the rotating body can be rotated.

In each aspect described above, it is preferable that in plan view of the rotating body, the rotating body and the driving body are in contact with each other at a specific coordinate position, and in response to attitude-changing of the rotating body, the coordinate position where the rotating body and the driving body are in contact with each other changes.

In each aspect described above, it is preferable that, when the rotating body is rotated around the second rotation axis, a movement trajectory of a center point of the rotating body in the direction of the first rotation axis draws a whirling trajectory around the second rotation axis.

In each aspect described above, it is preferable to include: a supporting member that supports the rotating body rotatably around the first rotation axis; and a second power transmitting member piece that receives power transmission from another member and rotates the supporting member around the second rotation axis.

The "transmitting member piece" is one of members that constitute a series of power transmitting mechanisms. For example, in the case of making a train of gears constitute a power transmitting mechanism, each of the gears corresponds to the "transmitting member piece". In the case of making a train of frictional wheels constitute a power transmitting mechanism, each of the frictional wheels corresponds to the "transmitting member piece". In the case of making chain transmission or belt transmission constitute a power transmitting mechanism, a sprocket or a pulley corresponds to the "transmitting member piece".

It is preferable that a conveying-direction changing device includes planarly a plurality of the conveyor devices described above, wherein power is transmitted between the second power transmitting member pieces of the adjacent conveyor devices, the power causing the rotating bodies of the plurality of the conveyor devices to change the attitude.

Between the second power transmitting member pieces, for example, the power is transmitted with a gear, a chain, a belt, or the like.

It is preferable that the second power transmitting member piece is a gear, another gear is interposed between the second power transmitting member pieces of the adjacent conveyor devices so that power is transmitted between the second power transmitting member pieces of the adjacent conveyor devices, a number of teeth of the gear that is the second power transmitting member piece is a multiple of 6, and wherein a number of teeth of the another gear is a multiple of 3.

In each aspect described above, it is preferable to include a first power transmitting member piece that receives power transmission from another member to rotate the driving body.

The "transmitting member piece" is one of members that constitute a series of power transmitting mechanisms.

It is preferable that a conveying-direction changing device includes planarly a plurality of the conveyor devices described above, wherein power is transmitted between the first power transmitting member pieces of the adjacent conveyor devices, the power rotating the rotating bodies of the plurality of the conveyor devices.

Between the first power transmitting member pieces, for example, the power is transmitted with a gear, a chain, a belt, or the like.

Effect of Invention

The conveyor device and conveying-direction changing device of the present invention can convey a conveyance object in a number of directions and can construct a sorting system in a narrow space.

BRIEF DESCRIPTION OF DRAWINGS

FIGS. 2A and 2B each are a perspective view of a conveyor device that constitutes the conveying-direction changing device shown in FIG. 1, wherein FIGS. 2A and 2B show respective states where the direction of a rotating body is changed by rotation of a rotatable base.

FIGS. 11A, 11B, and 11C are a plan view, an enlarged view, and an arrow view viewed from an arrow direction, conceptually illustrating a relationship between a center point of the rotating body in the direction of a first rotation axis and a second rotation axis in a case of making the short shaft side of the conveying roller face a predetermined direction, wherein FIG. 11A shows a case of making the short shaft side of the conveying roller face the direction of 9 o'clock, FIG. 11B shows a case of making the short shaft side of the conveying roller face the direction of 7 o'clock 30 minutes, and FIG. 11C shows a case of making the short shaft side of the conveying roller face the direction of 6 o'clock.

BEST MODE FOR CARRYING OUT THE INVENTION

Hereinafter, an embodiment of the present invention will be further described. In the following description, the relationship between an upper portion and a lower portion is based on an attitude at the time of use.

Figure 1:
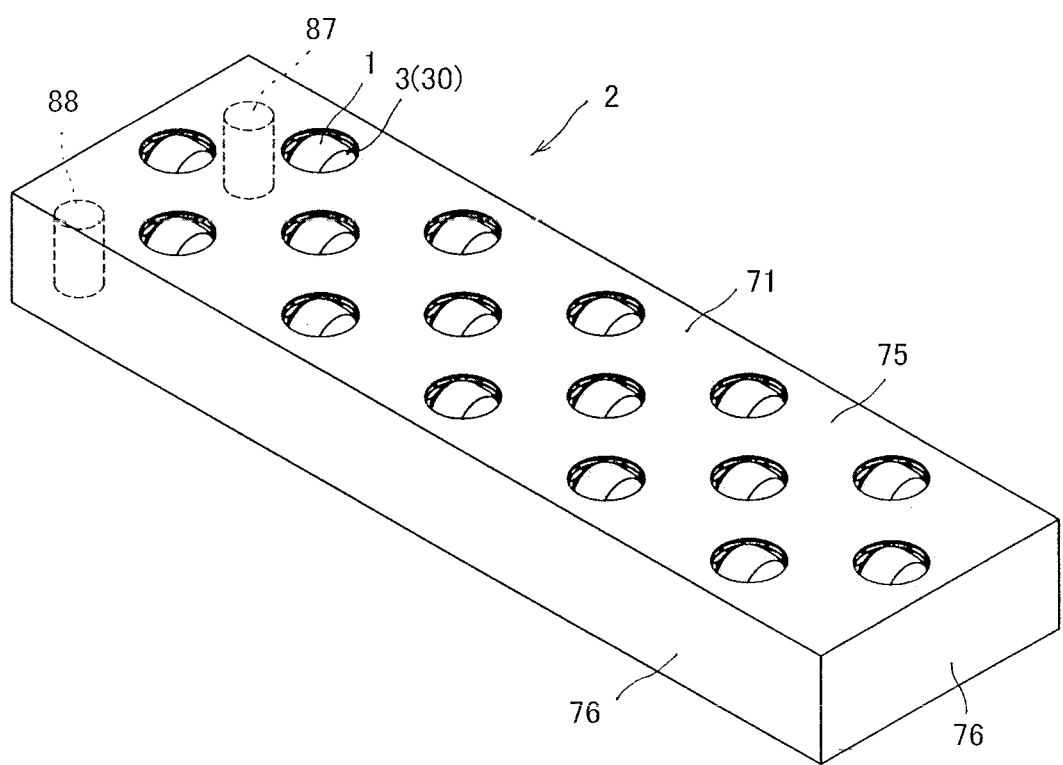
FIG. 1 is a perspective view of a conveying-direction changing device of an embodiment of the present invention.

FIG. 1 shows a conveying-direction changing device 2 according to the embodiment of the present invention. The conveying-direction changing device 2 is a device in which, as shown FIG. 1, a large number of small conveyor devices 1 are arranged planarly. That is, the conveying-direction changing device 2 is configured such that a large number of small conveyor devices 1 are spread all over the plane.

Figure 2A:
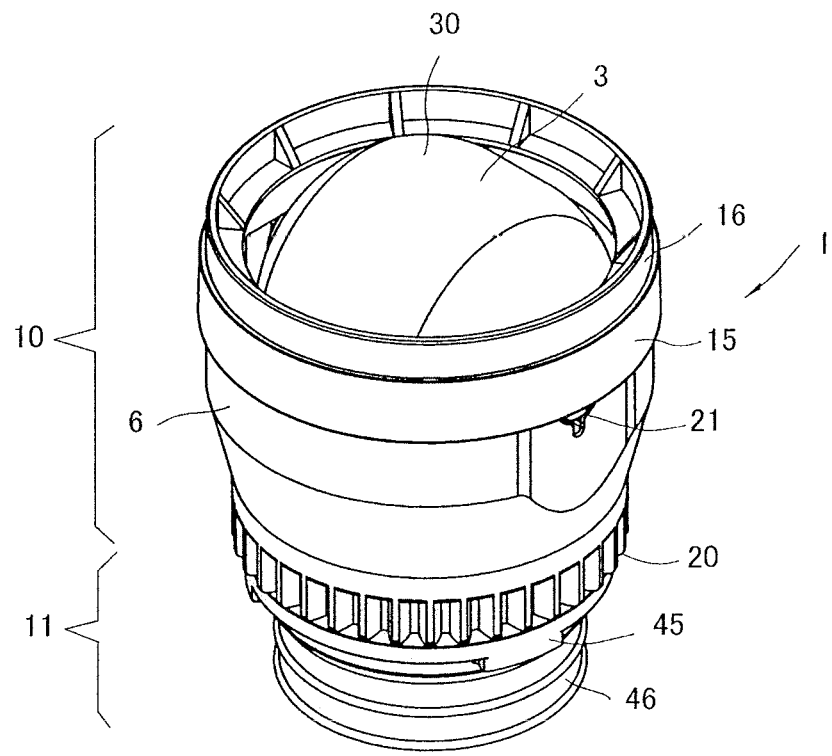
Figure 2B:
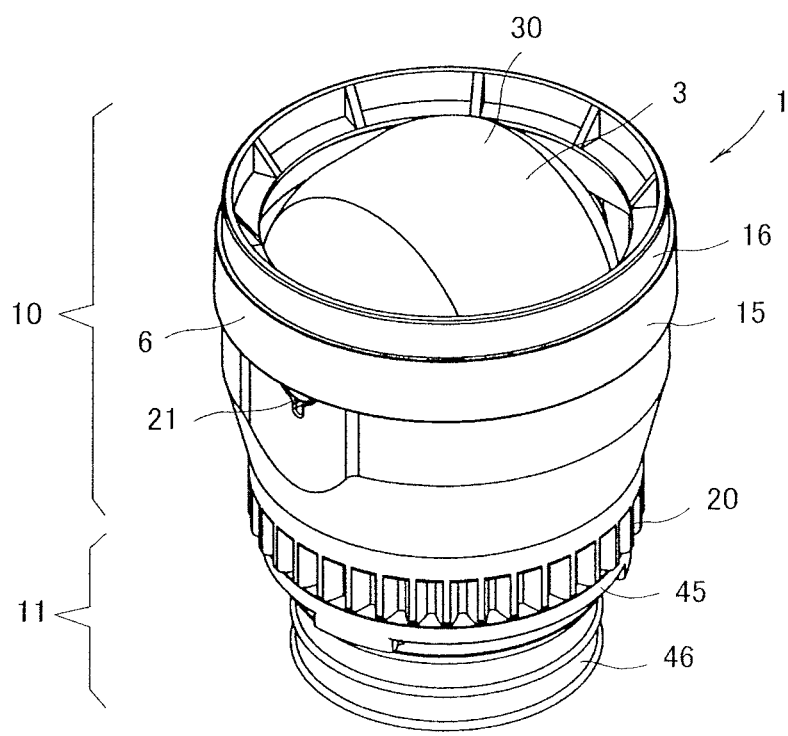

An appearance of the conveyor device 1 is as shown in FIGS. 2A and 2B.

The conveyor device 1 has a function that energizes a conveyance object with a roller portion (rotating body) 30 of a conveying roller 3 and moves the conveyance object. Moreover, it includes a conveyance direction changing means that changes a conveyance direction. Specifically, the conveyor device 1 includes a rotatable base 6, and the roller portion 30 of the conveying roller 3 is supported rotatably on the rotatable base 6. In the present embodiment, the direction of the conveying roller 3 is changed by rotating the rotatable base 6, whereby it is possible to change the movement direction of a conveyance object.

Figure 4:
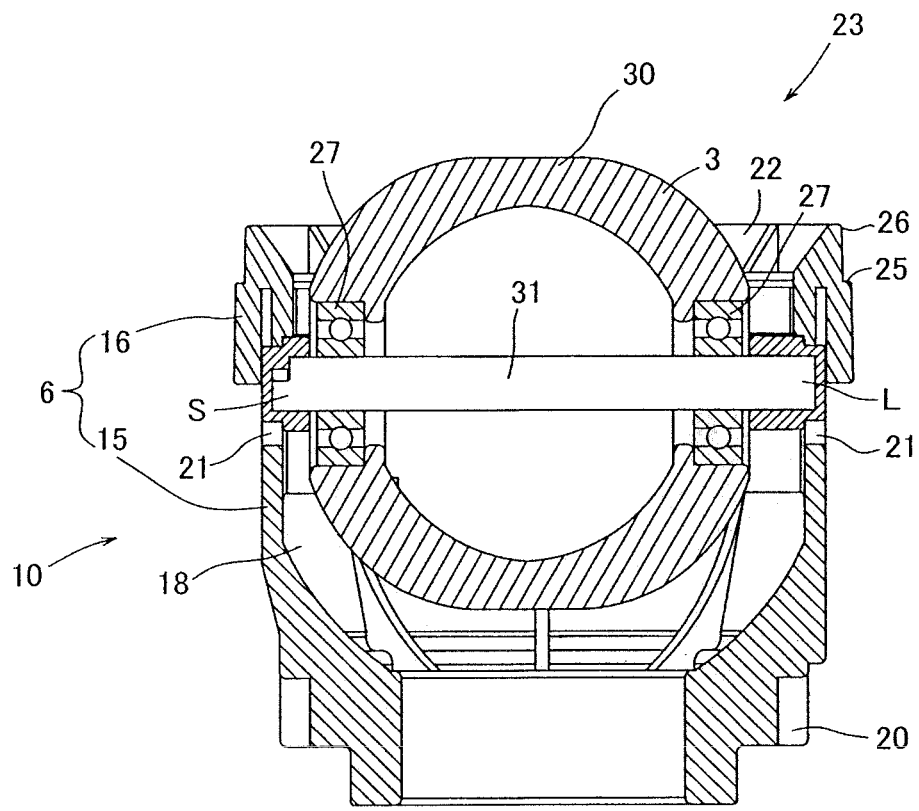
FIG. 4 is a sectional view in a state where the conveyor device in FIGS. 2A and 2B are divided into a rotatable base side and a driving member side.
Figure 4:
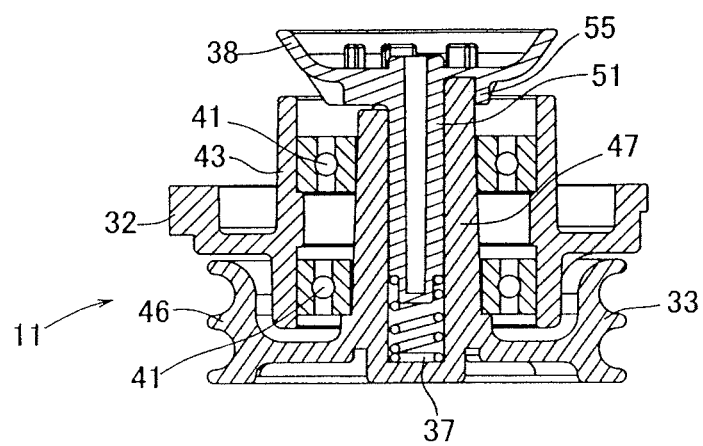

Hereinafter, a structure of the conveyor device 1 will be described. As shown in FIG. 4, the conveyor device 1 is divided into a rotatable base-side member 10 and a fixed base-side member 11 and is a device in which the both members are combined integrally.

Figure 5:
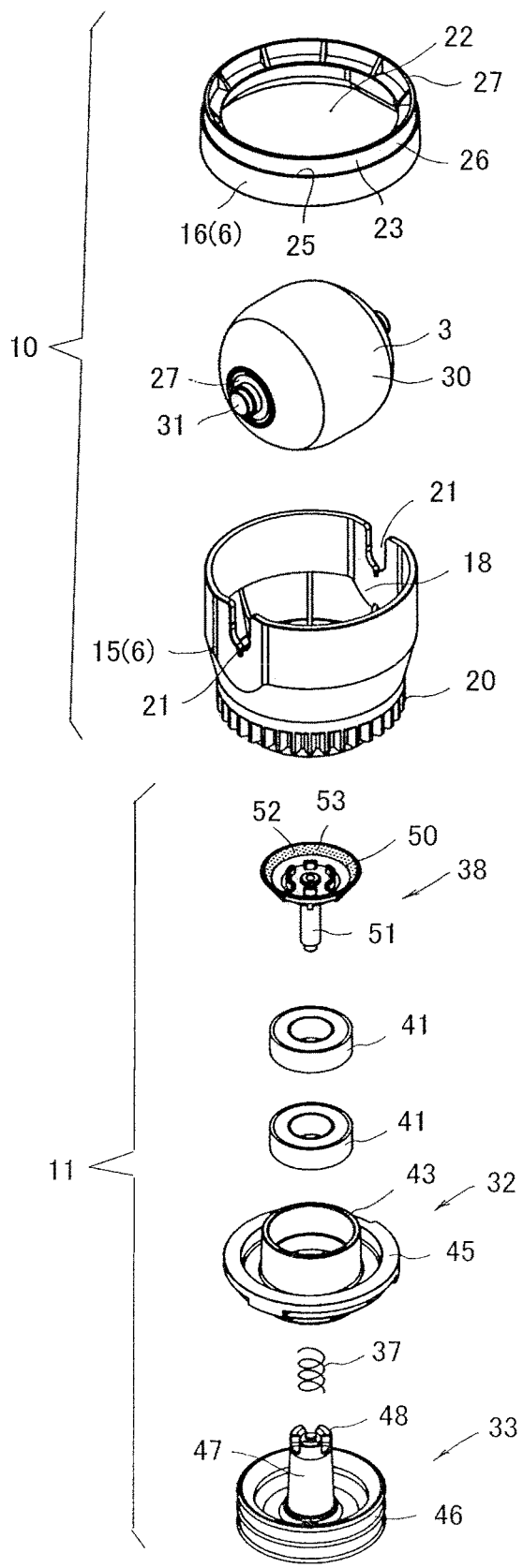
FIG. 5 is an exploded perspective view of the conveyor device in FIGS. 2A and 2B.

The rotatable base-side member 10 is a member in which the roller portion 30 of the conveying roller 3 is supported rotatably on the rotatable base 6. As shown in FIG. 5, the rotatable base 6 includes a roller receiving cup 15 and a pressing member 16.

As shown in FIG. 5, the roller receiving cup 15 is a cylinder body shaped such that a capacity on an upper portion side is made large and a lower portion side is made narrower. The roller receiving cup 15 is a supporting member that supports the roller portion 30 rotatably.

The roller receiving cup 15 is the cylinder body as described above, and its inside is penetrated in the vertical direction.

An upper portion of the roller receiving cup 15 functions as a roller accommodating section 18, and its inside is a hollow.

In a lower portion of the roller receiving cup 15, on its outer periphery, a gear 20 is engraved as shown in FIG. 5. Since the gear 20 is formed integrally with the roller receiving cup 15, when the gear 20 is rotated, the whole roller receiving cup 15 is rotated, whereby the roller portion 30 in the inside is rotated. In the present embodiment, the gear 20 functions as a second power transmitting member piece.

An upper end of the roller receiving cup 15 is opened. On a side wall of the roller accommodating section 18 of the roller receiving cup 15, notches 21 are provided at two places. The notches 21 at the two places are opposed to each other.

The pressing member 16 is a lid corresponding to an opening of an upper portion of the roller receiving cup 15. A large opening 22 is provided at the center of the pressing member 16. The diameter of the opening 22 is smaller than the diameter of the roller portion 30.

Figure 3:
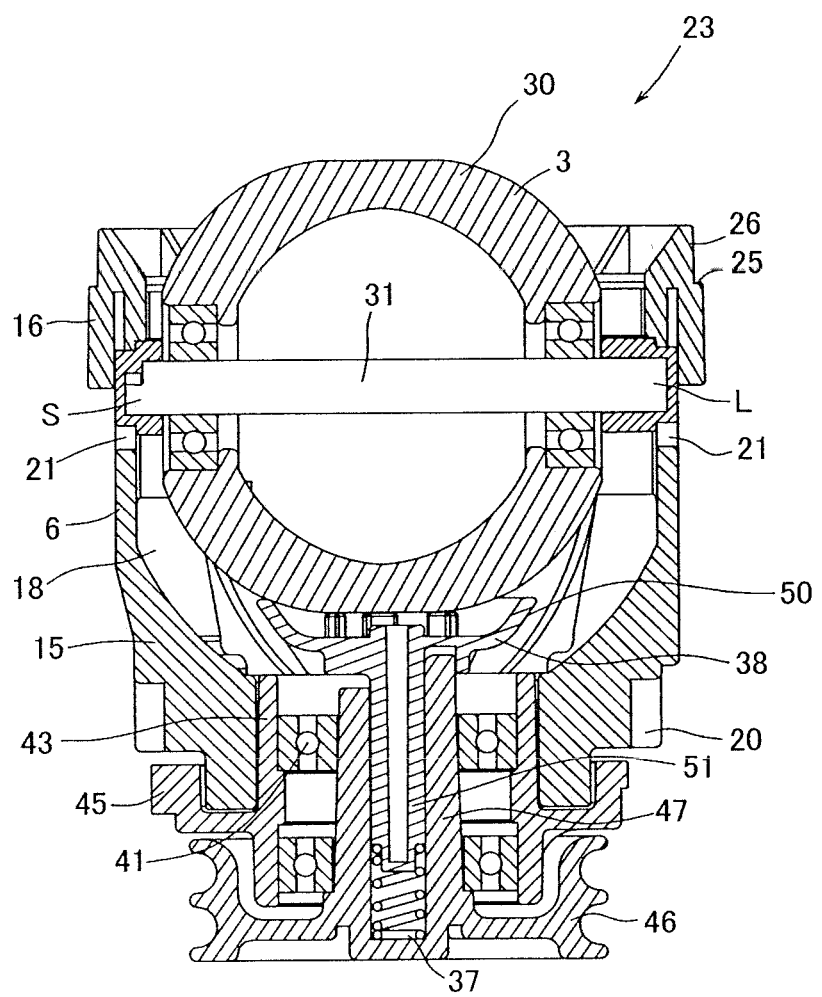
FIG. 3 is a sectional view of the conveyor device in FIGS. 2A and 2B.

As shown in FIGS. 3, 4, and 5, a step portion 23 is provided on the outer periphery of the pressing member 16. That is, a horizontal wall portion 25 and a vertical wall portion 26 are provided at an upper end portion on the outer periphery of the pressing member 16.

The conveying roller 3 includes the roller portion (rotating body) 30 and a shaft 31.

The shape of the roller portion 30 is a barrel and is nearly a sphere.

The shaft 31 penetrates the roller portion 30. Bearings 27 are attached to the roller portion 30, and the shaft 31 is supported by the bearings 27.

Both ends of the shaft 31 protrude from the roller portion 30. In the present embodiment, an amount of protrusion of the shaft 31 from the roller portion 30 is different between both ends of the shaft 31, and an amount of protrusion at one end is shorter than that at the other end. For convenience of explanation, a side where an amount of protrusion is smaller is referred to as a short shaft S, and a side where an amount of protrusion is longer is referred to as a long shaft L.

In the conveying roller 3, the roller portion 30 is accommodated in the roller accommodating section 18 of the roller receiving cup 15, and the both ends of the shaft 31 engage with the notches 21 of the roller receiving cup 15.

As described above, the roller portion 30 includes the bearings 27 and the shaft 31 penetrates the roller portion 30 through the bearings 27. Accordingly, the roller portion 30 is supported by the roller receiving cup 15 so as to be rotatable freely.

The pressing member 16 is attached to the opening of the upper portion of the roller receiving cup 15. A part of the roller portion 30 is exposed from the opening 22 of the pressing member 16.

The roller portion 30 of the conveying roller 3 is accommodated rotatably in the roller accommodating section 18 formed between the roller receiving cup 15 and the pressing member 16.

However, the position of the roller portion 30 is located at a position eccentric to one side from the center of the roller receiving cup 15. As described above, amounts of protrusion of the shaft 31 from the roller portion 30 are different at right and left sides. Accordingly, the roller portion 30 comes slightly near to the short shaft S side from the center of the roller receiving cup 15.

Next, the fixed base-side member 11 will be described.

The fixed base-side member 11 includes a lower lid member 32, a power transmitting member 33, a driving member 38, a spring 37, and bearings 41.

The lower lid member 32 includes a cylindrical portion 43 at the center, and a flange portion 45 at the intermediate portion in its longitudinal direction (vertical direction). The cylindrical portion 43 communicates in the longitudinal direction.

The power transmitting member 33 includes a pulley section 46 at one end (lower portion side), and a power transmitting shaft 47 protrude from the center of the pulley section 46.

The pulley section 46 is a two-stage pulley. The pulley section 46 functions as a first power transmitting member piece.

The power transmitting shaft 47 is a small diameter cylinder. At the tip of the power transmitting shaft 47, an engaging section 48 is provided. The engaging section 48 is a portion in which a part of the cylinder is cut out.

The driving member 38 includes a driving body 50 and a connecting shaft 51.

The driving body 50 has a general appearance shape like a dish, and has a taper-shaped contact portion 52 on an inner surface. Moreover, on the contact portion 52, a friction increase member 53 is pasted.

Figure 6A:
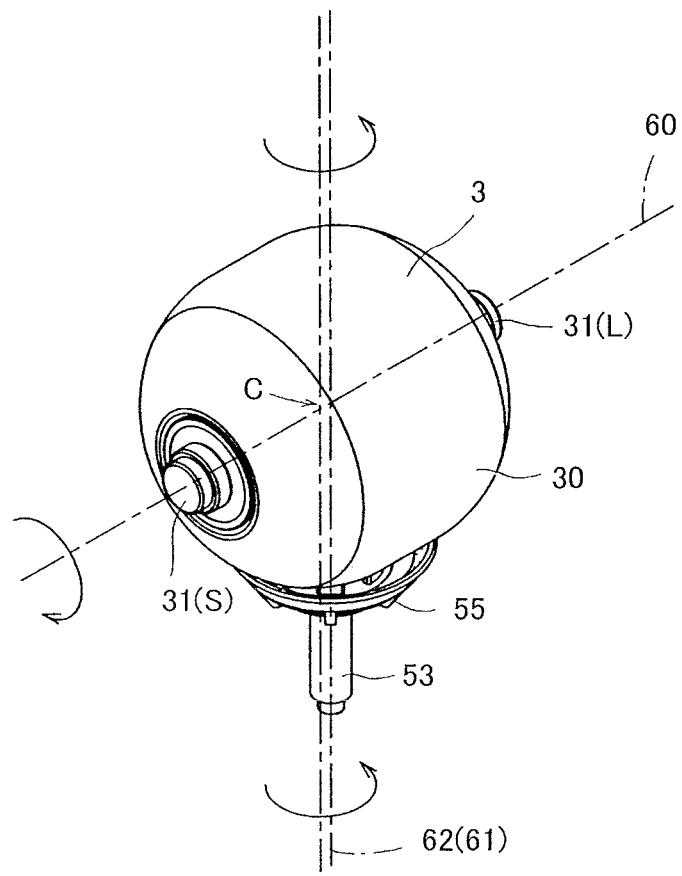
FIG. 6A is a perspective view conceptually illustrating the rotating body and a driving body of the conveyor device in FIGS. 2A and 2B.
Figure 6B:
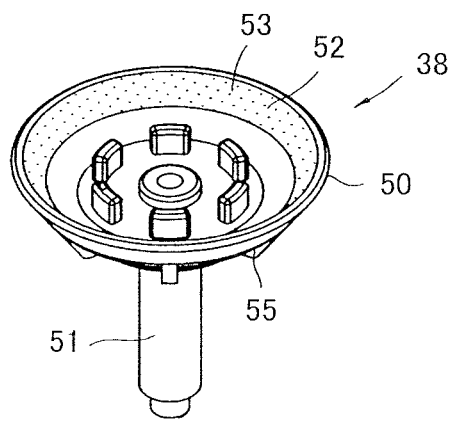
FIG. 6B is a perspective view of the driving body.

When viewing the contact portion 52 of the driving body 50 from the above, the contact portion 52 has an annular shape as shown in FIGS. 6A and 6B.

The connecting shaft 51 is provided in a vertical direction on the back-surface side of the driving body 50.

On the back surface of the driving body 50, an engaging section 55 is provided. The engaging section 55 is a protrusion that spreads out to a lower side.

As shown in FIGS. 3 and 4, in the fixed base-side member 11, the power transmitting shaft 47 of the power transmitting member 33 is inserted into a hole of the cylindrical portion 43 of the lower lid member 32 through bearings 41. Moreover, the connecting shaft 51 of the driving member 38 is inserted into the cylinder body of the power transmitting shaft 47.

In the cylindrical portion 43 of the lower lid member 32, a spring 37 is inserted. Accordingly, the power transmitting member 33 is energized in a protruding direction by the spring 37.

The power transmitting shaft 47 of the power transmitting member 33 engages with the connecting shaft 51 of the driving member 38 through the engaging sections 48 and 55.

The power transmitting shaft 47 and the connecting shaft 51 engage with each other so as to allow relative movement in an axial direction and to become one body in a rotation direction.

Since the power transmitting member 33 is inserted in the cylindrical portion 43 of the lower lid member 32 through the bearings 41, the power transmitting member 33 is rotatable relative to the cylindrical portion 43 of the lower lid member 32. The power transmitting shaft 47 of the power transmitting member 33 is fixed with a slip-out preventing member (not shown) so as not to move in the axial direction relative to the cylindrical portion 43 of the lower lid member 32. Accordingly, the power transmitting member 33 is attached to the lower lid member 32 so as to be rotatable and so as not to drop off.

As described above, the driving member 38 is attached to the power transmitting member 33 so as not to relatively rotate. Accordingly, when the pulley section (the first power transmitting member piece) 46 of the power transmitting member 33 rotates, the driving member 38 rotate synchronously. That is, when the pulley section 46 of the power transmitting member 33 rotates, the driving body 50 rotates.

As described above, the conveyor device 1 is a device in which the rotatable base-side member 10 and the fixed base-side member 11 are combined together.

That is, the conveyor device 1 is a device in which the fixed base-side member 11 is attached to a lower portion of the rotatable base-side member 10.

An assembled state is as shown in FIG. 3, so that the flange portion 45 of the fixed base-side member 11 covers an opening of a lower portion of the rotatable base 6, and an upper-portion side of the cylindrical portion 43 is inserted in the inside of the roller receiving cup 15.

The rotatable base-side member 10 and the fixed base-side member 11 are combined by a not-shown engaging member, and are integrated.

The driving body 50 of the driving member 38 belonging to the side of the fixed base-side member 11 is in the roller accommodating section 18.

Next, positional relationships among respective members constituting the conveyor device 1 will be described with reference to FIGS. 6A, 6B, and 7.

Figure 7:
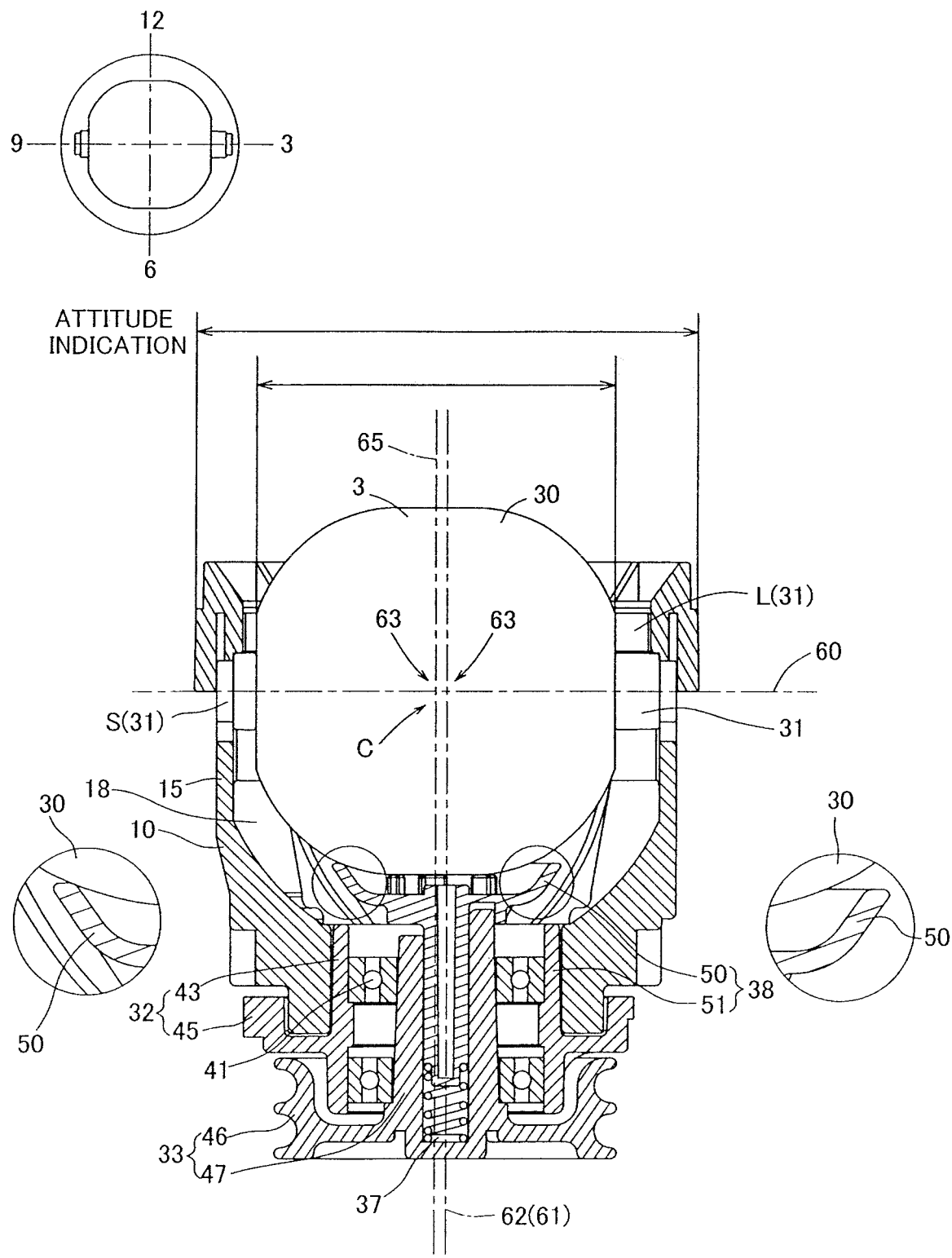
FIG. 7 is an explanatory view conceptually illustrating a positional relationship between the rotating body and the driving body in the conveyor device.
Figure 8B:
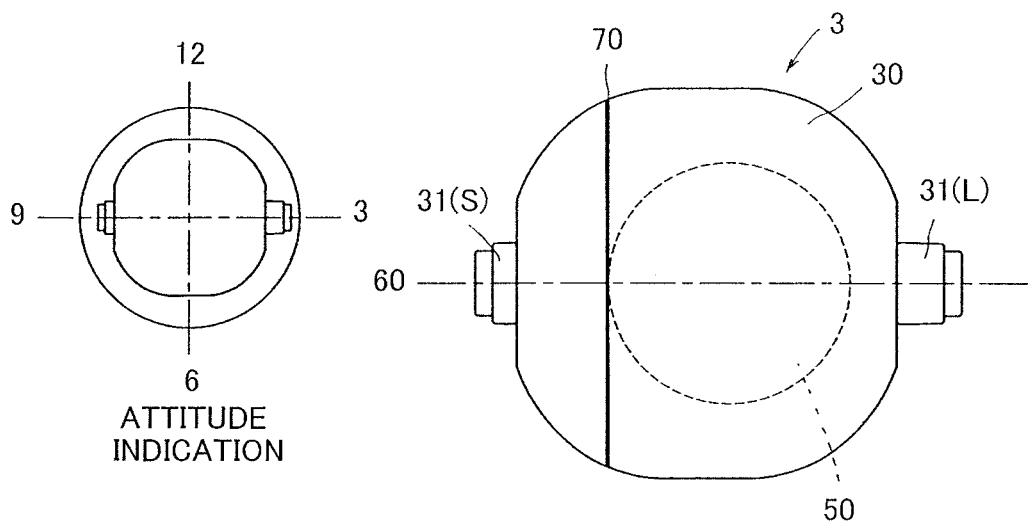
FIG. 8B is a plan view thereof.
Figure 8A:
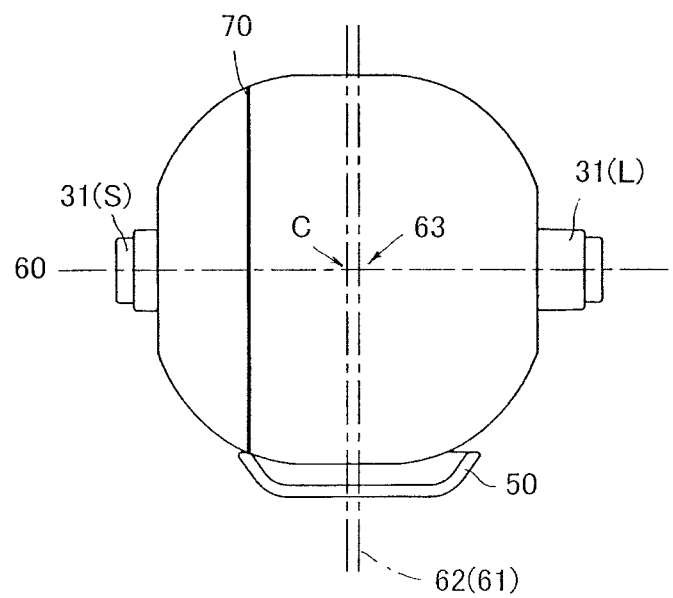
FIG. 8A is a front view conceptually illustrating a relationship between the rotating body and the driving body in a case of making a short shaft side of a conveying roller face the direction of 9 o'clock.

As shown in FIGS. 3 and 7, the conveying roller 3 is in the roller accommodating section 18 in the roller receiving cup 15, and the roller portion 30 is supported rotatably by the roller receiving cup 15.

The roller portion 30 rotates around the shaft 31 inserted into the roller portion 30. That is, a first rotation axis 60 of the roller portion 30 is a center line of the shaft 31 as shown in FIGS. 6A, 6B, and 7.

The first rotation axis 60 of the roller portion 30 faces a horizontal direction.

The roller receiving cup 15 is fixed to the fixed base-side member 11 of a lower portion through the lower lid member 32. The power transmitting shaft 47 of the power transmitting member 33 inserted into the cylindrical portion 43 of the fixed base-side member 11 is rotatably supported by the bearings 41.

Therefore, the rotatable base-side member 10 is rotatable relative to the power transmitting member 33 of a lower portion and the driving body 50 of an inner portion. The roller portion 30 in the rotatable base-side member 10 rotates integrally with the rotatable base-side member 10.

The rotatable base-side member 10 rotates around the power transmitting shaft 47 of the fixed base-side member 11. Accordingly, the roller portion 30 also rotates around the power transmitting shaft 47 of the fixed base-side member 11.

Therefore, a second rotation axis 61 of the roller portion 30 is a center line of the power transmitting shaft 47. The second rotation axis 61 is a vertical axis.

Since the driving body 50 installed in the roller accommodating section 18 is rotated by the power transmitting shaft 47 of the fixed base-side member 11, the driving body 50 rotates around the power transmitting shaft 47. Therefore, a third rotation axis 62 of the driving body 50 is a center line of the power transmitting shaft 47, and coincides with the second rotation axis 61 of the roller portion 30. The third rotation axis 62 is a vertical axis.

Here, as described above, in the present embodiment, an amount of protrusion of the shaft 31 from the roller portion 30 is different between the both ends of the shaft 31, and an amount of protrusion at one side is shorter as compared with the other side.

Therefore, a center C of the roller portion 30 in the direction of the first rotation axis 60 does not coincide with an intersection point 63 between the first rotation axis 60 and the second rotation axis 61 of the whole conveying roller 3. Specifically, the roller portion 30 is near to the short shaft S of the roller receiving cup 15, and the center C of the roller portion 30 in the direction of the first rotation axis 60 is near to the short shaft S.

The center C of the roller portion 30 deviates from the center line of the roller receiving cup 15 and comes near to the short shaft S.

Therefore, the roller portion 30 is at a position eccentric to one side in a horizontal direction. The second rotation axis 61 of the roller portion 30 does not pass through the center C of the roller portion 30 in the direction of the first rotation axis 60. A vertical line 65 passing through the center C of the roller portion 30 does not coincide with the third rotation axis 62.

On the basis of the attitude shown in FIGS. 4 and 7, the roller portion 30 as a whole is at a position coming near to the left side (the short shaft S side), and the center C of the single body of the roller portion 30 is at a position where the third rotation axis 62 and the second rotation axis 61 do not pass through.

FIG. 7 illustrates these relationships schematically, in which the roller portion 30 is rotatable around the first rotation axis 60 of one axis being a horizontal axis and the roller portion 30 is rotatable also around the second rotation axis 61 in the direction orthogonal to the first rotation axis 60.

The roller portion 30 changes its attitude by rotating around the second rotation axis 61, and can change the direction of the first rotation axis 60.

On the other hand, the driving body 50 rotates around the third rotation axis 62 being a vertical axis. The third rotation axis 62 is concentric with the second rotation axis 61, and the third rotation axis 62 is extended in a direction intersecting with the first rotation axis 60.

Moreover, the center C of the roller portion 30 in the direction of the first rotation axis 60 is eccentric relative to the second rotation axis 61 and the third rotation axis 62.

In the conveyor device 1 of the present embodiment, the driving body 50 is provided in the roller accommodating sections 18 and below the roller portion 30.

Moreover, the spring 37 is provided at a lower portion of the driving body 50, and the driving body 50 is energized toward the roller portion 30 of an upper portion.

The driving body 50 is pressed in contact with the circumferential surface of the roller portion 30 by the energizing force of the spring 37.

Here, in the present embodiment, the roller portion 30 is at a position eccentric to one side in the horizontal direction, and the center C of the roller portion 30 in the direction of the first rotation axis 60 is eccentric relative to the second rotation axis 61 and the third rotation axis 62.

Therefore, the vertical line 65 passing through the center C of a sphere of the roller portion 30 does not coincide with the third rotation axis 62, and the driving body 50 becomes in a state of a one-side contact relative to the circumferential surface of the roller portion 30, as shown in an enlarged view within a circle in FIG. 7. That is, as shown in FIG. 7, a part of the surface of the driving body 50 comes into contact with the circumferential surface of the roller portion 30, and the other parts do not come into contact.

As shown in the model diagram of FIG. 7, in the case where the first rotation axis 60 is horizontal, the short shaft S of the conveying roller 3 faces the direction of 9 o'clock on clock-like coordinates as shown with an attitude indication in terms of a plane direction, and the first rotation axis 60 faces the same direction, the driving body 50 comes in point contact with the roller portion 30 at a position of the direction of 9 o'clock on clock-like coordinates and does not come into contact at the other parts.

Moreover, a region where the roller portion 30 comes into contact with the driving body 50 is a certain contact range 70 that is near to the short shaft side S relative to the second rotation axis 61. The contact range 70 further comes nearer to the short shaft side S than the center C of the sphere of the roller portion 30.

As shown in the model diagrams of FIGS. 7, 8A, 8B, and 11A, in the case where the first rotation axis 60 being a horizontal axis faces the direction of 9 o'clock on clock-like coordinates, the driving body 50 comes in point contact with the contact range 70 of the roller portion 30 at a portion of 9 o'clock on coordinates. Accordingly, when rotating the driving body 50, the roller portion 30 receives power transmission and rotates around the first rotation axis 60.

As described above, the roller portion 30 is rotatable around the second rotation axis 61 being a vertical axis.

Figure 9B:
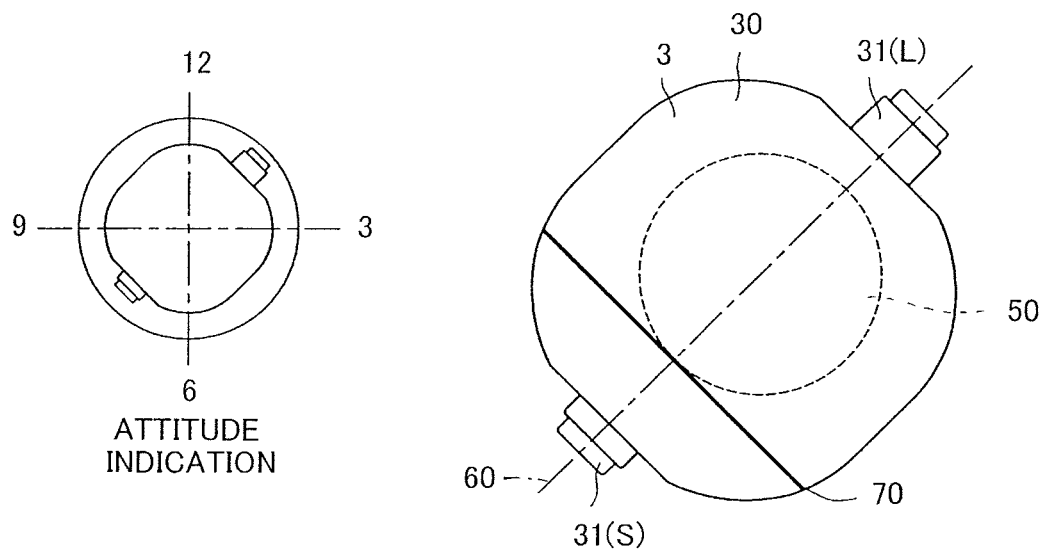
FIG. 9B is a plan view thereof.
Figure 9A:
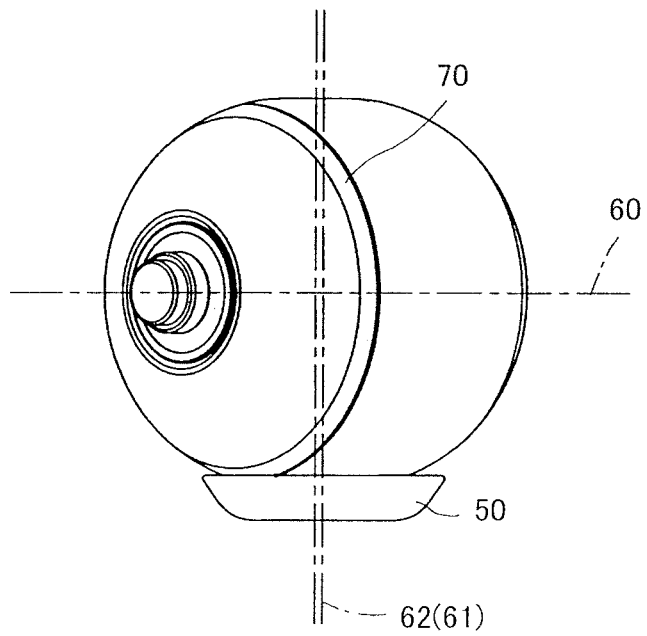
FIG. 9A is a front view conceptually illustrating a relationship between the rotating body and the driving body in a case of making the short shaft side of the conveying roller face the direction of 7 o'clock 30 minutes.

For example, as shown with attitude indication in FIGS. 9A, 9B, and 11B, in the case where the roller portion 30 rotates around the second rotation axis 61 being a vertical axis, the short shaft S of the conveying roller 3 faces the direction of 7 o'clock 30 minutes on clock-like coordinates, and the first rotation axis 60 being a horizontal-axis faces the same direction, the driving body 50 comes in point contact with the roller portion 30 at a portion of 7 o'clock 30 minutes and does not come into contact at the other portions.

Moreover, a region where the roller portion 30 comes into contact with the driving body 50 is the same with that in the above-described case where the roller portion 30 faces the direction of 9 o'clock and is a certain contact range 70 that comes nearer to the short shaft side S than the center 63 in the direction of the first rotation axis 60. As described above, the contact range 70 further comes nearer to the short shaft side S than the center C of the sphere of the roller portion 30.

As shown in the model diagrams of FIGS. 9A, 9B, and 11B, in the case where the first rotation axis 60 faces the direction of 7 o'clock 30 minutes on clock-like coordinates, the driving body 50 comes in point contact with the contact range 70 of the roller portion 30 at a portion of 7 o'clock 30 minutes on coordinates. Accordingly, when rotating the driving body 50, the roller portion 30 receives power transmission and rotates around the first rotation axis 60.

Figure 10B:
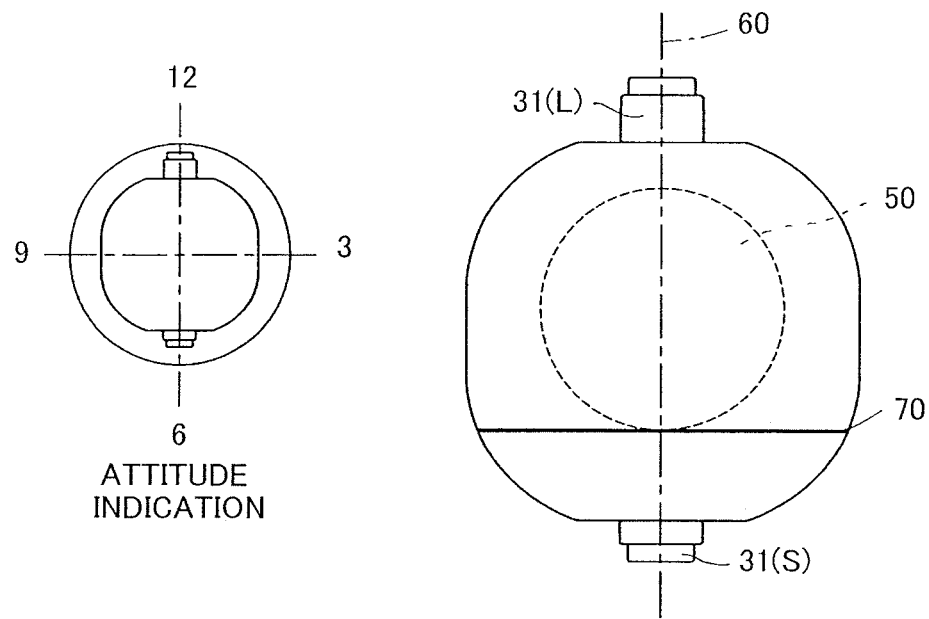
FIG. 10B is a plan view thereof.
Figure 10A:
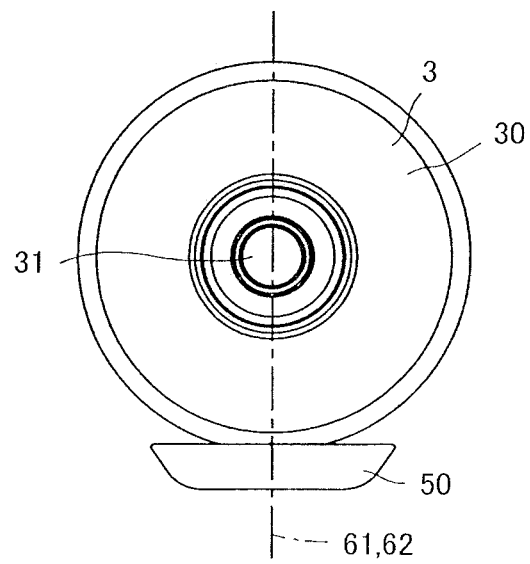
FIG. 10A is a front view conceptually illustrating a relationship between the rotating body and the driving body in a case of making the short shaft side of the conveying roller face the direction of 6 o'clock.

Further, as shown with attitude indication in FIGS. 10A, 10B, and 11C, in the case where the roller portion 30 rotates around the second rotation axis 61 being a vertical axis, the short shaft S of the conveying roller 3 faces the direction of 6 o'clock on clock-like coordinates, and the first rotation axis 60 being a horizontal-axis faces the same direction, the driving body 50 comes in point contact with the roller portion 30 at a portion of 6 o'clock and does not come into contact at the other portions.

Moreover, a region where the roller portion 30 comes into contact with the driving body 50 is the same with that in the above-described case where the roller portion 30 faces the direction of 9 o'clock and is a certain contact range 70 that comes nearer to the short shaft side S than the center 63 in the direction of the first rotation axis 60.

As shown in the model diagrams of FIGS. 10A, 10B, and 11C, in the case where the first rotation axis 60 faces the direction of 6 o'clock on clock-like coordinates, the driving body 50 comes in point contact with the contact range 70 of the roller portion 30 at a portion of 6 o'clock on coordinates. Accordingly, when rotating the driving body 50, the roller portion 30 receives power transmission and rotates around the first rotation axis 60.

As described above, in the present embodiment, in plan view of the roller portion 30, the roller portion 30 and the driving body 50 come in point contact with each other at a specific position on clock-like coordinates. Then, in response to a change in the direction of the roller portion 30 caused by the attitude-changing of the roller portion 30, a coordinate position where the roller portion 30 and the driving body 50 come into contact with each other changes.

Moreover, in the case where the roller portion 30 is rotated around the second rotation axis 61, a movement trajectory of the center point of the roller portion 30 in the direction of the first rotation axis 60 is as shown in FIGS. 11A to 11C and draws a whirling trajectory around the second rotation axis 61.

Next, the conveying-direction changing device 2 into which the conveyor device 1 is incorporated will be described.

As described above, the conveying-direction changing device 2 is a device in which, as shown in FIG. 1, a large number of small conveyor devices 1 are arranged planarly.

The conveying-direction changing device 2 includes: a conveyance box 71 in which the conveyor devices 1 are spread planarly; and external belts 72 and 73 (power transmitting member).

Figure 12:
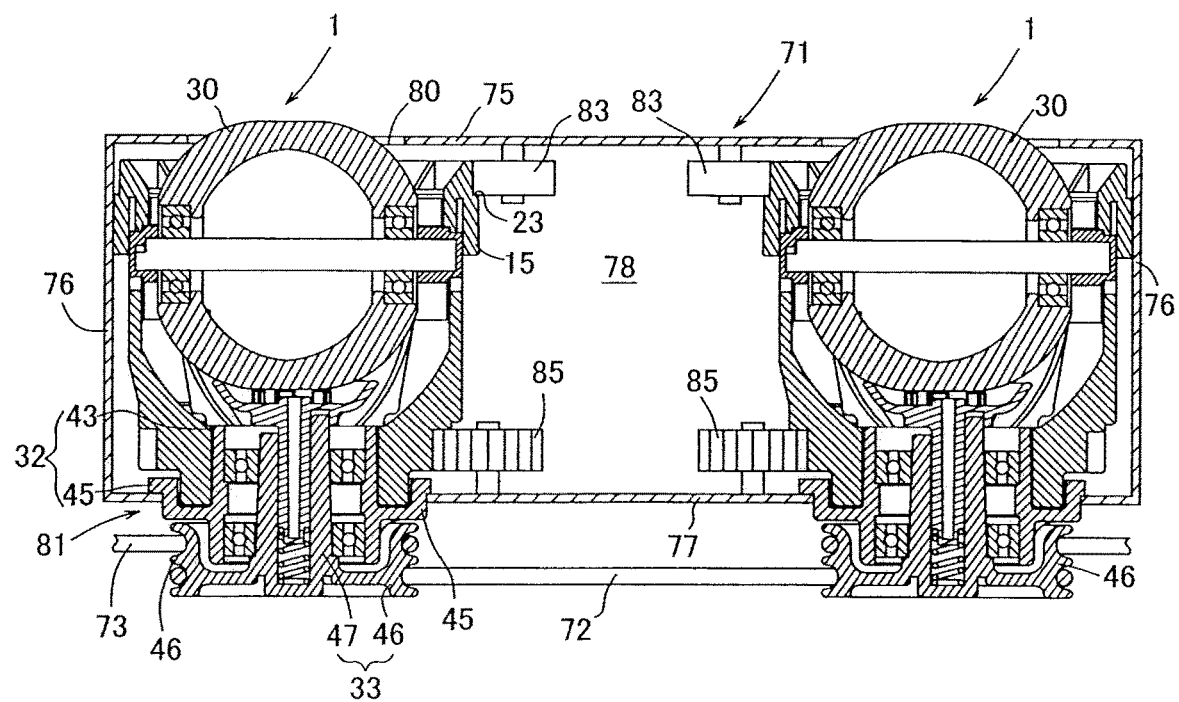
FIG. 12 is a sectional view of the conveying-direction changing device in FIG. 1.

The conveyance box 71 is, as shown in FIG. 12, a box body that is covered with a top face plate 75, side face plates 76, and a bottom face plate 77 and has a hollow portion 78 thereinside.

Openings 80 and 81 are formed on the top face plate 75 and the bottom face plate 77 of the conveyance box 71. The openings 80 and 81 are coaxial and communicate with each other.

Most of the conveyor device 1 is accommodated in the hollow portion 78 of the conveyance box 71, and a part of the roller portion 30 protrudes from the opening 80 of the top face plate 75.

Moreover, the pulley section 46 of the conveyor device 1 protrudes from the opening 81 of the bottom face plate 77.

Each conveyor device 1 is fixed to the bottom face plate 77 of the conveyance box 71 with a screw or the like (not shown). That is, the flange portion 45 of the lower lid member 32 of the conveyor device 1 is brought into contact with the circumference of the hole of the opening 81 of the bottom face plate 77, and is fastened with a screw or the like to be fixed to the conveyance box 71.

The upper surface of each conveyor device 1 is separated from the top face plate 75.

Moreover, bearings 83 are suspended from the top face plate 75 of the conveyance box 71, and the outer wheel of the bearing 83 engages with the step portion 23 provided on the outer periphery of the roller receiving cup 15 of the conveyor device 1. Therefore, while the lower lid member 32 of the fixed base-side member 11 of the conveyor device 1 is fixed integrally with the conveyance box 71 and is not rotatable, the rotatable base-side member 10 is rotatable relative to the conveyance box 71.

Figure 13:
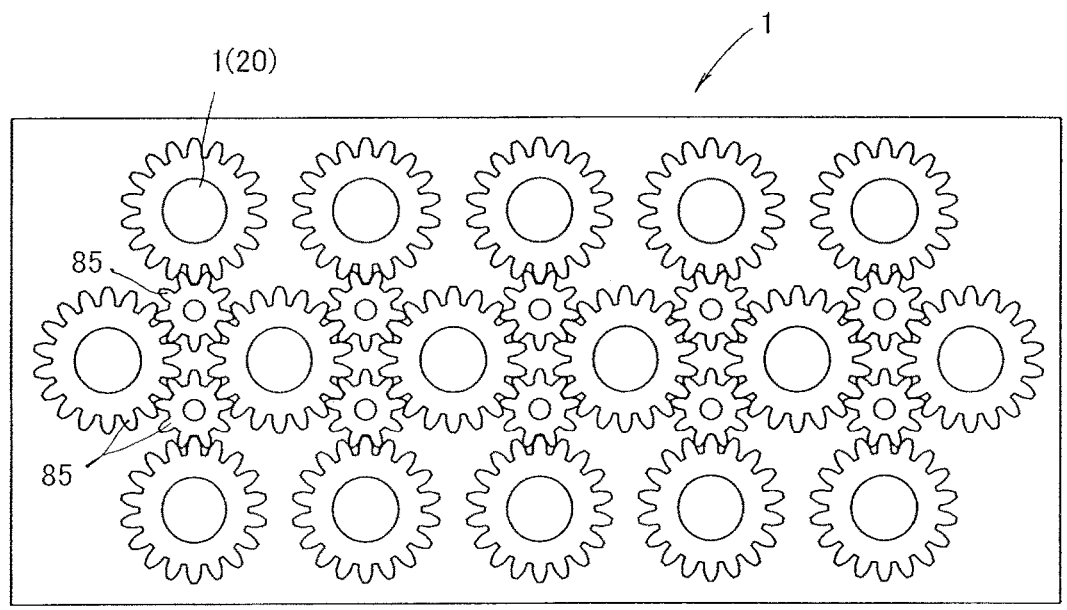
FIG. 13 is a plane sectional view of the conveying-direction changing device in FIG. 1 and shows a relationship between gear for rotation-driving, of each conveyor device and an idle gear.

In the conveyance box 71, as shown in FIGS. 12 and 13, a large number of idle gears 85 are installed. As shown in FIG. 13, the idle gear 85 is provided between the respective gears (the second power transmitting member piece) 20 of the adjacent conveyor devices 1.

In the present embodiment, the respective gears 20 of all the conveyor devices 1 installed in the conveyance box 71 engage with each other through the idle gears 85 and constitute one gear train as a whole.

In the conveyance box 71, as shown in FIG. 1, a motor 87 for attitude-changing is built in, and one of the gears is rotated by the motor 87.

Figure 14A:
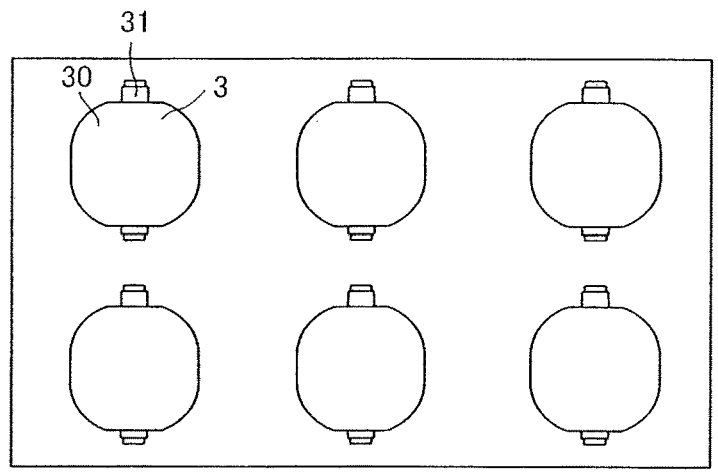
FIGS. 14A, 14B, and 14C each are a plan view illustrating an operation of the conveying-direction changing device of FIG. 1.
Figure 14B:
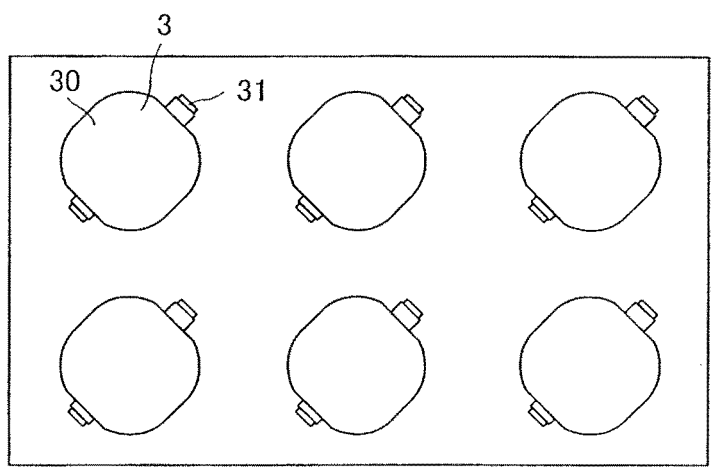
Figure 14C:
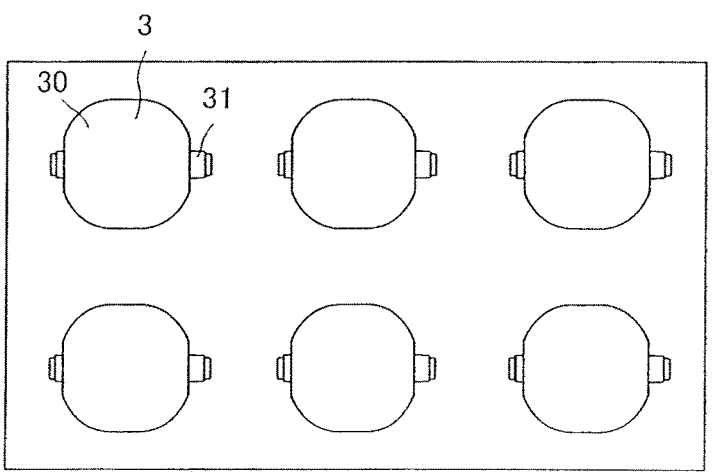

As a result, the respective rotatable base-side members 10 of all the conveyor devices 1 are rotated by the same angle, and the directions thereof are changed at once as shown in FIGS. 14A to 14C.

According to the experiment by the present inventors, in the case where the number of teeth of the gear (the second power transmitting member piece) 20 of the conveyor device 1 is a multiple of 6 and the number of teeth of the idle gear 85 is a multiple of 3, power transmission is performed by the conveyor device 1 most smoothly.

In the present embodiment, the number of teeth of the gear 20 of the conveyor device 1 is 18, which is a multiple of 6. On the other hand, the number of teeth of the idle gear 85 is 9, which is a multiple of 3.

Moreover, as shown in FIG. 12, the pulley section 46 of the conveyor device 1 is exposed from a lower portion of the conveyance box 71. Then, on the respective pulley sections 46 of the adjacent conveyor devices 1, belts 72 and 73 are suspended around.

Moreover, in the conveyance box 71, as shown in FIG. 1, a motor 88 for travelling is built in, and one of the pulley sections 46 is rotated by the motor 88 for travelling.

As a result, the respective roller portions 30 of all the conveyor devices 1 rotate synchronously to urge a conveyance object and move the conveyance object.

As described above, by driving the motor 87 for rotation, all the rotatable base-side members 10 rotate by the same angle, and all the roller portions 30 face the direction of the same angle, and by rotating the motor 88 for travelling, the respective roller portions 30 rotate to send out a conveyance object in a desired direction. That is, even if the center line of the rotatable base 6 of an upper portion and the center of the fixed base-side member 11 of a lower portion are shifted from each other, a conveyance object can be sent out in a desired direction.

For example, if the short shaft side of the conveying roller 3 is changed to face the direction of 7 o'clock 30 minutes as shown in FIGS. 9A, 9B, 11B, and 14B from a state where the short shaft side of the conveying roller 3 faces the direction of 9 o'clock as shown in FIGS. 8A, 8B, 11A, and 14C, a conveyance object is sent out by changing the travelling direction by 45 degrees.

Further, if the short shaft side of the conveying roller 3 is changed to face the direction of 6 o'clock as shown in FIGS. 10A, 10B, 11C, and 14A from a state where the short shaft side of the conveying roller 3 faces the direction of 9 o'clock as shown in FIGS. 8A, 8B, 11A, and 14C, a conveyance object is sent out by changing the travelling direction by 90 degrees.

In the embodiment described above, by making the position of the roller portion 30 eccentric to one side, the driving body 50 is in a state of a one-side contact relative to the roller portion 30. However, by shifting the third rotation axis 62 of the driving body 50 relative to the second rotation axis 61 of the roller portion 30, the similar effects may be expected.

In the embodiment described above, the shape of the roller portion 30 is approximately spherical. The spherical roller portion 30 is recommended because only by shifting the position of the roller portion 30, the roller portion 30 can be in a state of a one-side contact relative to the driving body 50.

However, by exercising ingenuity, a cylindrical roller can also be used.

Figure 15:
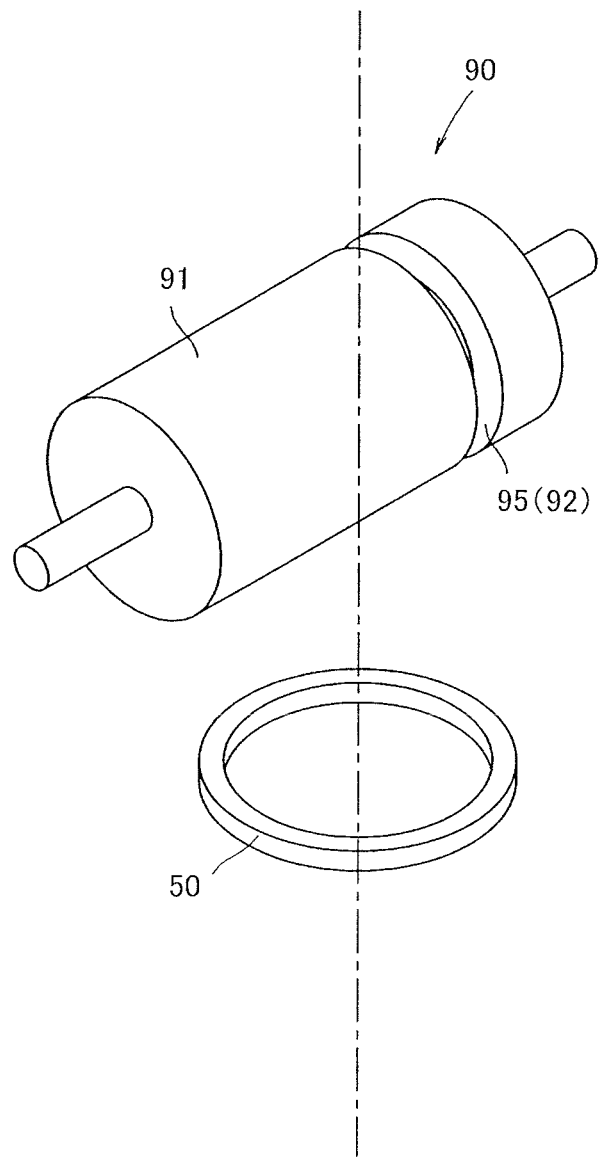
FIG. 15 is a perspective view conceptually illustrating a rotating body and a driving body in a conveyor device of another embodiment of the present invention.
Figure 16A:
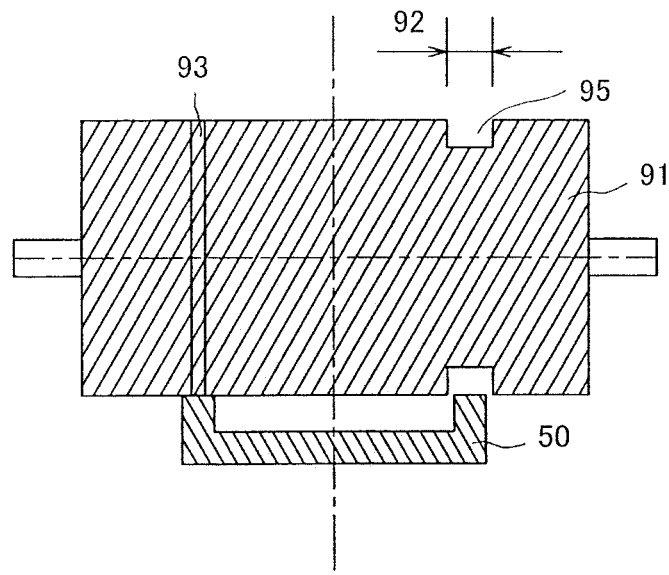
FIG. 16A is a front sectional view conceptually illustrating the rotating body and the driving body in the conveyor device of FIG. 15.
Figure 16B:
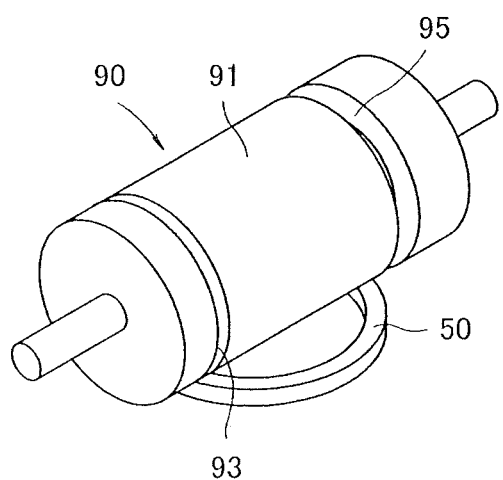
FIG. 16B is a perspective view thereof.

For example, like a conveyor device 90 shown in FIGS. 15, 16A, and 16B, a columnar roller portion 91 is adopted, and an annular groove 95 for escape is formed on a region 92 of a part of the roller portion 91.

Moreover, a region 93 of the other part is brought into point contact with the driving body 50.

As a result, the driving body 50 becomes in a state of a one-side contact relative to the roller portion 91.

In the embodiment described above, the vertical line 65 passing through the center C of the roller portion 30 in the direction of the first rotation axis 60 does not coincide with the third rotation axis 62.

The present invention is not limited to this configuration, and the vertical line 65 passing through the center C of the roller portion 30 may be made to coincide with the third rotation axis 62.

Figure 17:
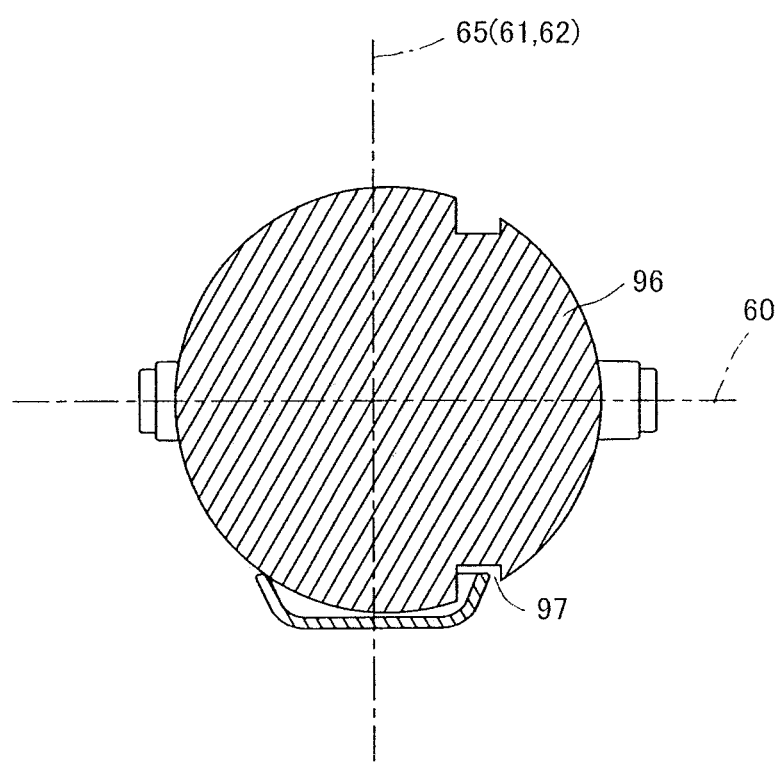
FIG. 17 is a sectional view conceptually illustrating a rotating body and a driving body in a conveyor device of still another embodiment of the present invention.

For example, as shown in FIG. 17, a roller portion 96, which is spherical but has an annular groove 97 for escape on a part of the roller portion 96, is used.

In this configuration, a vertical line 68 passing through the center C of the roller portion 96 in the direction of the first rotation axis 60 is assumed as the third rotation axis 62 and the second rotation axis 61.

Also, in this configuration, the driving body 50 becomes in a state of a one-side contact to the roller portion 96, and, regardless of the attitude of the roller portion 96, the driving body 50 comes into contact with the roller portion 96 and can transmit power.

In the embodiment described above, the gear 20 provided on the outer periphery of the roller receiving cup 15 functions as the second power transmitting member piece, and engage with other gears to rotate the roller receiving cup 15 being a support member and rotate the roller portion 30 around the second rotation axis 61.

The second power transmitting member piece is not limited to the gear 20 and may be a constituent member of other power transmitting members. However, in the conveying-direction changing device 2, since it is necessary to rotate a plurality of roller portions 30 synchronously, it is desirable to adopt a power transmitting member having no slip. From this viewpoint, as the second power transmitting member piece, it is desirable to adopt a gear, a sprocket, or a toothed pulley.

On the other hand, since the first power transmitting member piece does not necessarily need to rotate synchronously, other than the pulley adopted in the above-described embodiment, it is possible to use a gear, a frictional wheel, a chain, or the like.

In the embodiment described above, although the conveying-direction changing device 2 is constituted by arranging the conveyor devices 1 in the shape of a plane, a conveyance object may be conveyed by a single conveyor device 1.

In the embodiment described above, the shaft 31 is inserted into the roller portion 30, and the roller portion 30 rotates around the shaft 31. However, a spherical rotating body having no specific shaft may be adopted to be held slidably on a periphery of a conveying roller so that the rotating body is rotated in any direction.

EXPLANATION OF REFERENCE SIGNS

1: Conveyor device
2: Conveying-direction changing device
3: Conveying roller
6: Rotatable base
10: Rotatable base-side member
11: Fixed base-side member
18: Roller accommodating section
20: Gear (second power transmitting member piece)
30: Roller portion (rotating body)
33: Power transmitting member
38: Driving member
46: Pulley section (first power transmitting member piece)
50: Driving body
60: First rotation axis
61: Second rotation axis
62: Third rotation axis
90: Conveyor device
91: Roller portion

The invention claimed is:

1. A conveyor device comprising:
a rotating body that energizes a conveyance object; and
a driving body that gives a rotating force to the rotating body to thereby energize a conveyance object,
wherein the rotating body is rotatable around at least a first rotation axis,
the driving body giving the rotating force to the rotating body to thereby cause the rotating body to rotate around the first rotation axis,
the rotating body being rotatable around a second rotation axis extending in a direction intersecting with the first rotation axis, thereby changing an attitude of the rotating body to change a direction of the first rotation axis, wherein the driving body is rotated around a third rotation axis with power, the third rotation axis extending in a direction intersecting with the first rotation axis, wherein the driving body is in contact with the rotating body at a position eccentric to one end in the direction of the first rotation axis relative to the second rotation axis, and wherein regardless of attitude-changing of the rotating body, the rotating body is rotated around the first rotation axis to thereby energize a conveyance object with rotation of the driving body around the third rotation axis.

2. The conveyor device according to claim 1,
wherein the second rotation axis and the third rotation axis are aligned approximately on a same straight line, and wherein a center of the rotating body in the direction of the first rotation axis is eccentric relative to the third rotation axis.

3. The conveyor device according to claim 1,
wherein the rotating body is spherical, barrel-shaped, or columnar, and wherein regardless of attitude-changing of the rotating body, a circumference of a part of the rotating body in an axial direction is in contact with the driving body and other parts are substantially not in contact with the driving body.

4. The conveyor device according to claim 1,
wherein the driving body includes an annular contact portion, wherein the contact portion is in contact with a part of the rotating body, and wherein the rotating body is rotated with rotation of the contact portion.

5. The conveyor device according to claim 1,
wherein in plan view of the rotating body, the rotating body and the driving body are in contact with each other at a specific coordinate position, and wherein in response to attitude-changing of the rotating body, the coordinate position where the rotating body and the driving body are in contact with each other changes.

6. The conveyor device according to claim 1, wherein when the rotating body is rotated around the second rotation axis, a movement trajectory of a center point of the rotating body in the direction of the first rotation axis draws a whirling trajectory around the second rotation axis.

7. The conveyor device according to claim 1, comprising:
a supporting member that supports the rotating body rotatably around the first rotation axis; and
a second power transmitting member piece that receives power transmission from another member and rotates the supporting member around the second rotation axis.

8. A conveying-direction changing device comprising planarly a plurality of the conveyor devices according to claim 7, wherein power is transmitted between the second power transmitting member pieces of the adjacent conveyor devices, the power causing the rotating bodies of the plurality of the conveyor devices to change the attitude.

9. The conveying-direction changing device according to claim 8,
wherein the second power transmitting member piece is a gear,
wherein another gear is interposed between the second power transmitting member pieces of the adjacent conveyor devices so that power is transmitted between the second power transmitting member pieces of the adjacent conveyor devices,
wherein a number of teeth of the gear that is the second power transmitting member piece is a multiple of 6, and
wherein a number of teeth of the another gear is a multiple of 3.

10. The conveyor device according to claim 1, comprising a first power transmitting member piece that receives power transmission from another member to rotate the driving body.

11. A conveying-direction changing device comprising planarly a plurality of the conveyor devices according to claim 10,
wherein power is transmitted between the first power transmitting member pieces of the adjacent conveyor devices, the power rotating the rotating bodies of the plurality of the conveyor devices.

12. A conveying-direction changing device comprising planarly a plurality of the conveyor devices according to claim 1.

13. A conveyor device comprising:
a rotating body that energizes a conveyance object; and
a driving body that gives a rotative force to the rotating body to thereby energize a conveyance object,
wherein the rotating body is rotatable around at least a first rotation axis,
the driving body giving the rotating force to the rotating body to thereby cause the rotating body to rotate around the first rotation axis,
the rotating body being rotatable around a second rotation axis extending in a direction intersecting with the first rotation axis, thereby changing an attitude of the rotating body to change a direction of the first rotation axis,
wherein the driving body is rotated with power around a third rotation axis,
wherein the driving body includes an annular contact portion, the contact portion being in contact with the rotating body in a manner of a partial contact, and
wherein regardless of attitude-changing of the rotating body, the rotating body is rotated around the first rotation axis to thereby energize a conveyance object with rotation of the driving body around the third rotation axis.

14. The conveyor device according to claim 13, wherein the driving body is in contact with the rotating body at a position eccentric to one end in the direction of the first rotation axis relative to the second rotation axis.

15. The conveyor device according to claim 13,
wherein the rotating body is spherical, barrel-shaped, or columnar, and
wherein regardless of attitude-changing of the rotating body, a circumference of a part of the rotating body in an axial direction is in contact with the driving body and other parts are substantially not in contact with the driving body.

16. The conveyor device according to claim 13,
wherein in plan view of the rotating body, the rotating body and the driving body are in contact with each other at a specific coordinate position, and
wherein in response to attitude-changing of the rotating body, the coordinate position where the rotating body and the driving body are in contact with each other changes.

17. The conveyor device according to claim 13, wherein when the rotating body is rotated around the second rotation axis, a movement trajectory of a center point of the rotating body in the direction of the first rotation axis draws a whirling trajectory around the second rotation axis.

18. The conveyor device according to claim 13, comprising:
   a supporting member that supports the rotating body rotatably around the first rotation axis; and
   a second power transmitting member piece that receives power transmission from another member and rotates the supporting member around the second rotation axis.

19. The conveyor device according to claim 13, comprising a first power transmitting member piece that receives power transmission from another member to rotate the driving body.

20. A conveying-direction changing device comprising planarly a plurality of the conveyor devices according to claim 13.

* * * * *